United States Patent [19]
Mertens

[11] 3,805,959
[45] Apr. 23, 1974

[54] RADIOACTIVE WASTE TREATMENT SYSTEM

[75] Inventor: Johann Mertens, Santa Cruz, Calif.

[73] Assignee: Nuclear Waste Systems Company, Campbell, Calif.

[22] Filed: June 3, 1971

[21] Appl. No.: 149,643

[52] U.S. Cl............ 210/170, 210/257, 210/258, 210/262, 210/295, 252/301.1 W
[51] Int. Cl.............................. B01d 23/20
[58] Field of Search .......... 210/153, 170, 257, 258, 210/259, 260, 262, 298, 534, 265, 266, 38, 295, 75; 252/301.1 W

[56] References Cited
UNITED STATES PATENTS

| | | | |
|---|---|---|---|
| 2,221,444 | 11/1940 | Dodge et al. | 210/262 X |
| 3,361,649 | 1/1968 | Karter | 252/301.1 W |
| 2,846,072 | 8/1958 | Goetz | 210/260 X |
| 3,444,079 | 5/1969 | Bowers | 210/259 X |
| 3,444,077 | 5/1969 | Finch | 210/265 X |
| 3,480,542 | 11/1969 | Bucksteeg et al. | 210/257 X |
| 3,372,808 | 3/1968 | Sabo | 210/259 X |
| 2,918,700 | 12/1959 | Hatch | 210/38 X |
| 3,196,106 | 7/1965 | Haden et al. | 210/38 X |

Primary Examiner—Samih N. Zaharna
Assistant Examiner—F. F. Calvetti
Attorney, Agent, or Firm—Jack M. Wiseman

[57] ABSTRACT

Radioactive waste in nuclear reactor power plants include solid radioactive process waste, floor drain wastes and backwash water from filters and demineralizers. The solid radioactive process waste comprises filter sludges and demineralizer resins or ion exchange resins. In the radioactive waste treatment system of the present invention, the filter sludges and demineralizer resins are moved to large tanks and collected in the large tanks. The backwash water and floor drain water wastes are percolated through settled solids by gravity. In so doing, the wastes are pre-filtered and pre-demineralized. After being pre-filtered and pre-demineralized, these wastes waters are then polished in the water treatment system and returned to a condensate storage tank.

7 Claims, 13 Drawing Figures

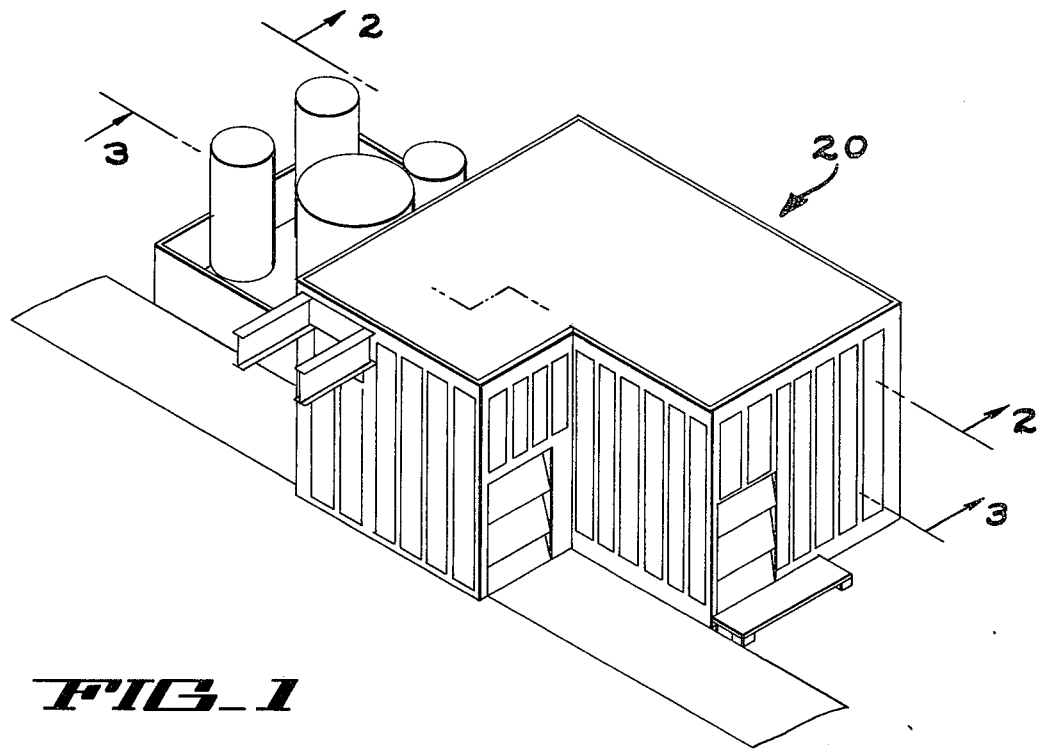
FIG_1
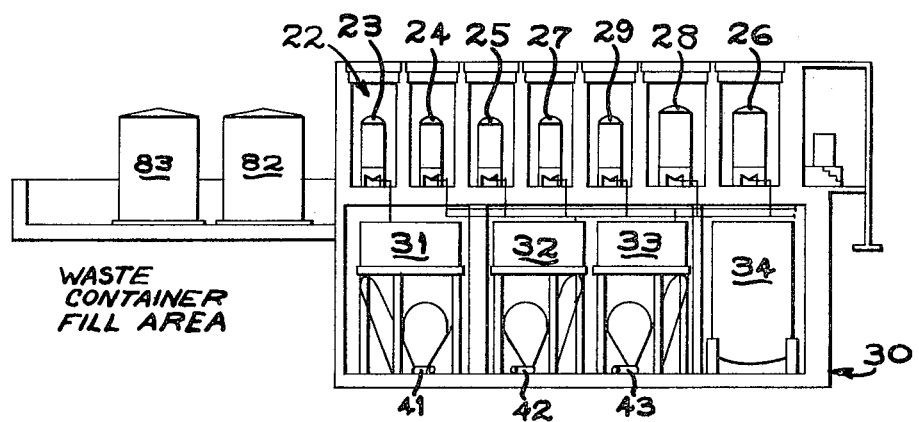
FIG_2
INVENTOR.
JOHANN MERTENS
BY Jack M. Wiseman
ATTORNEY

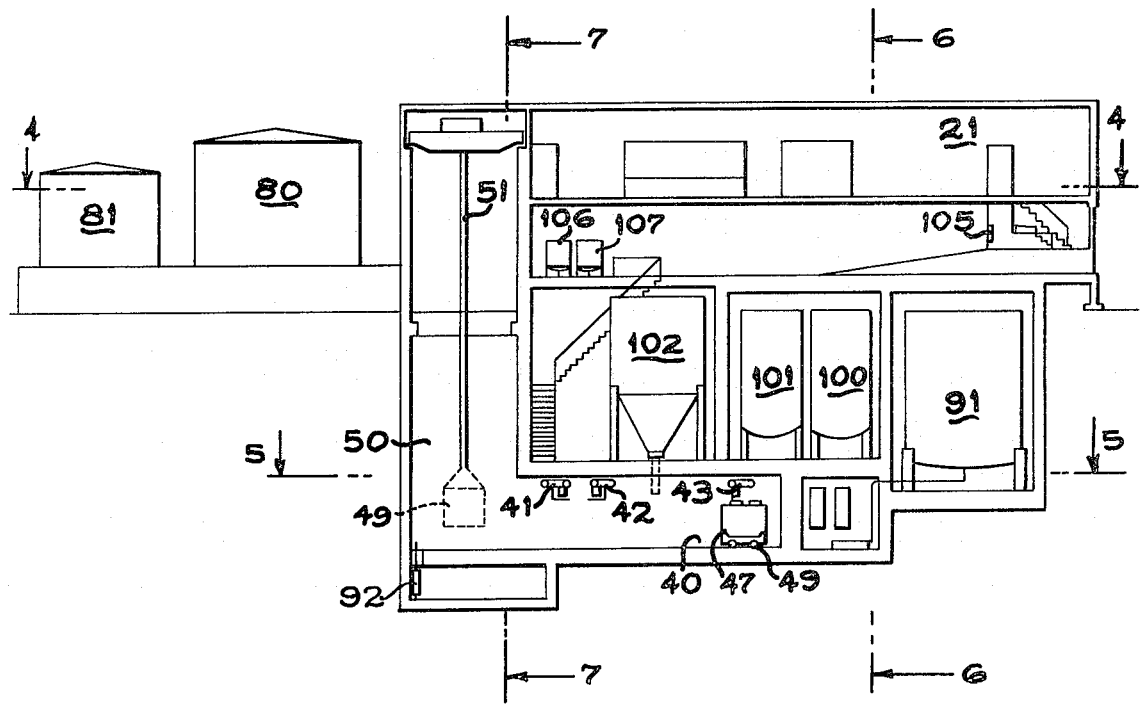
FIG_3
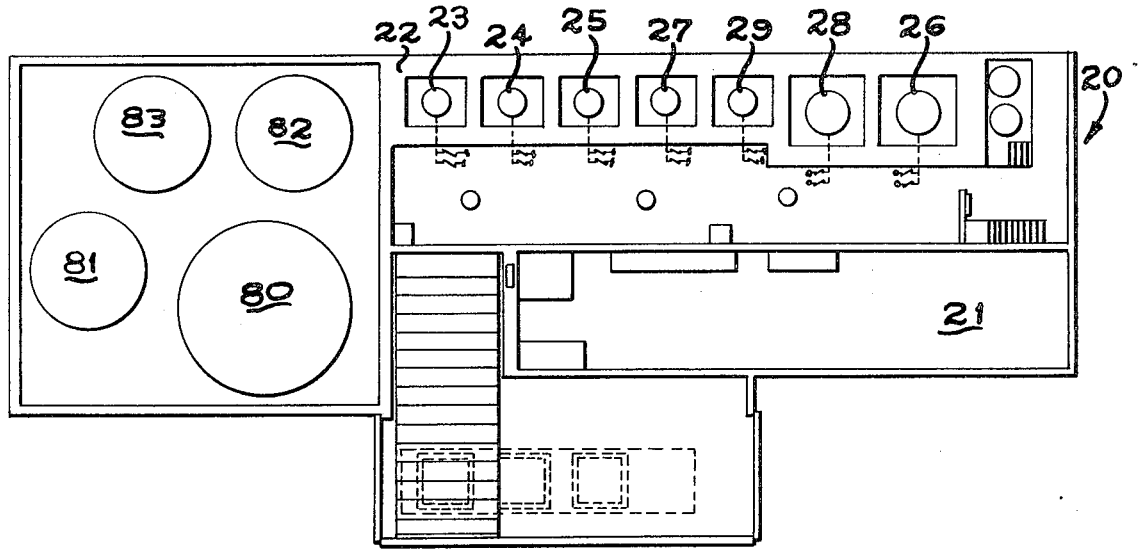
FIG_4

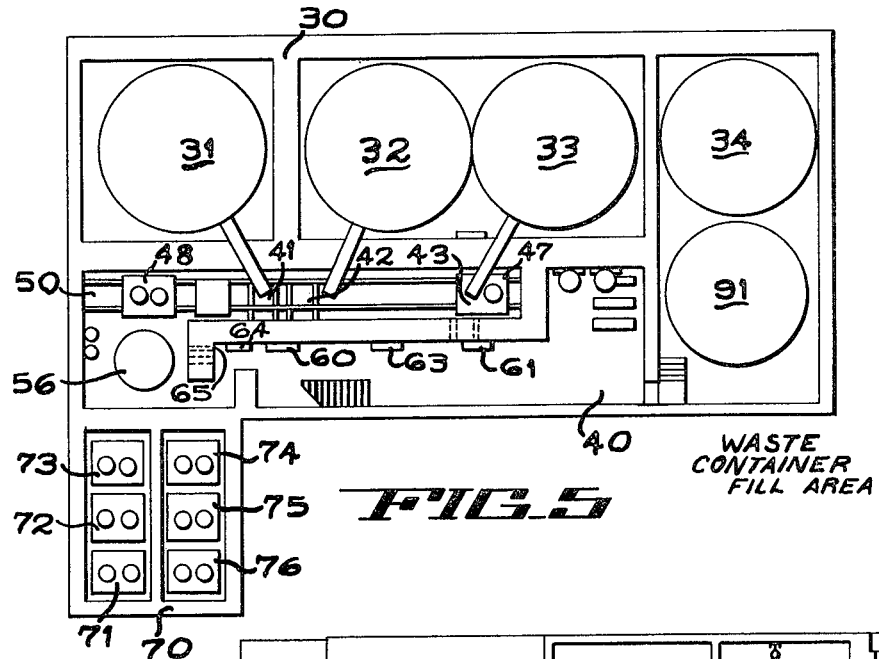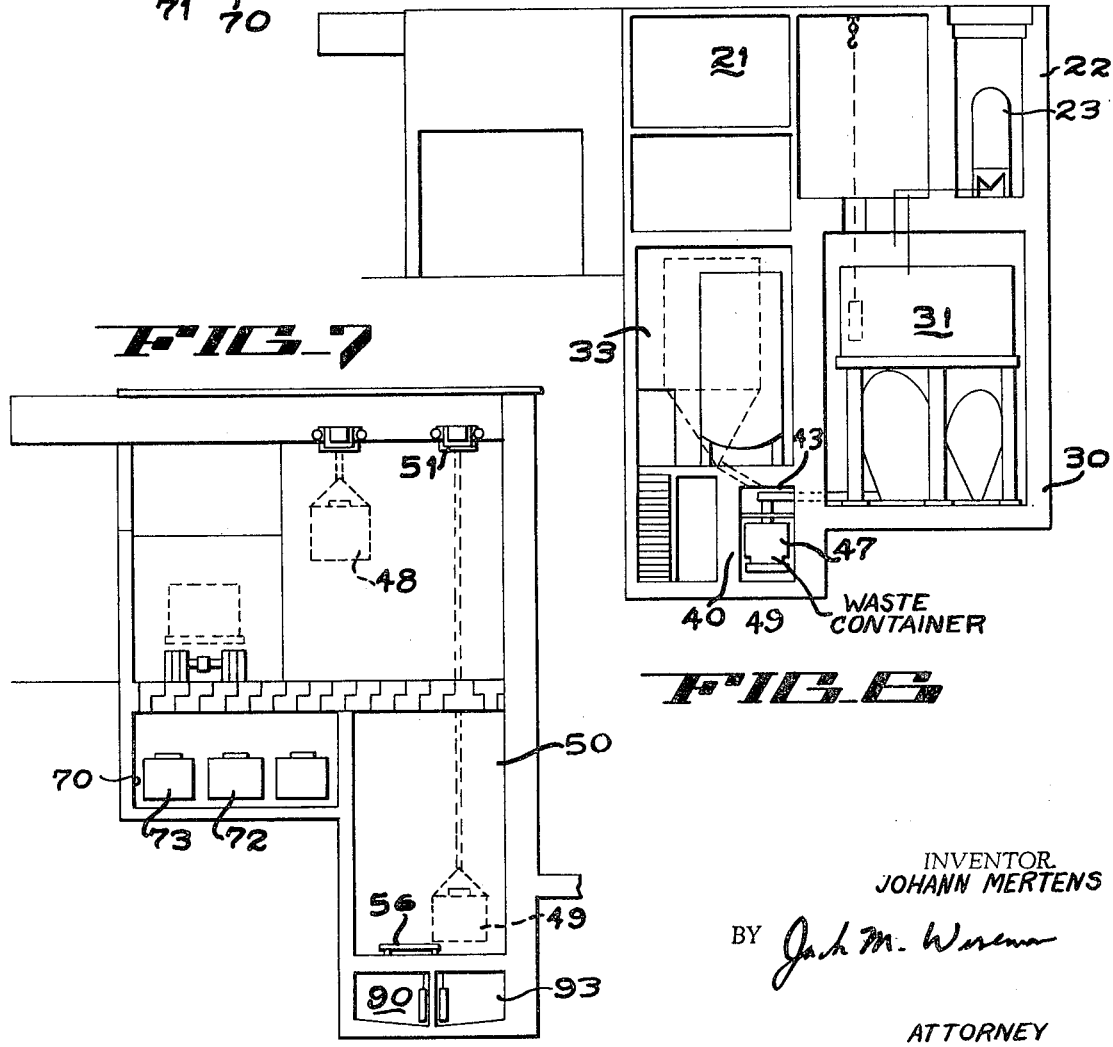

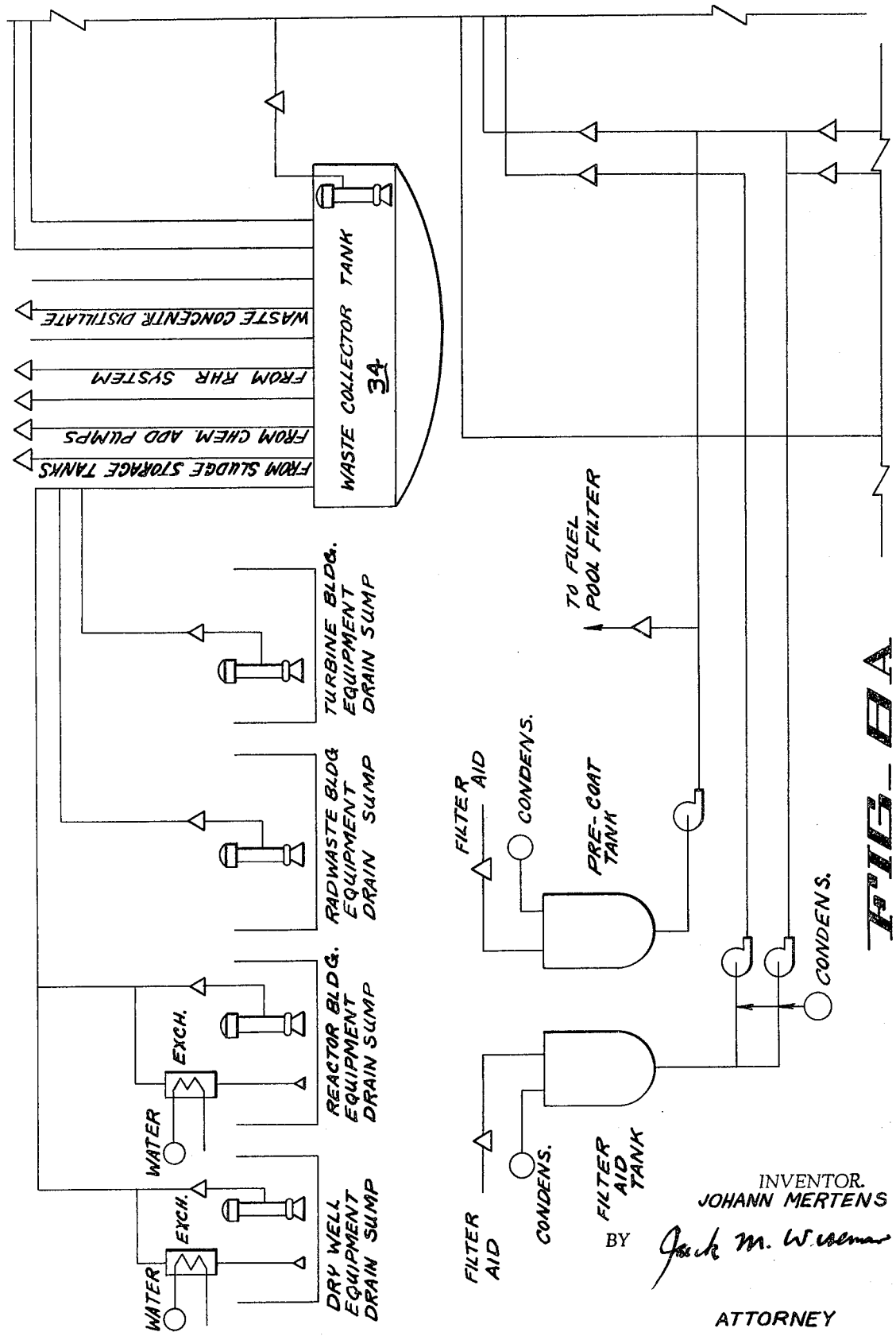

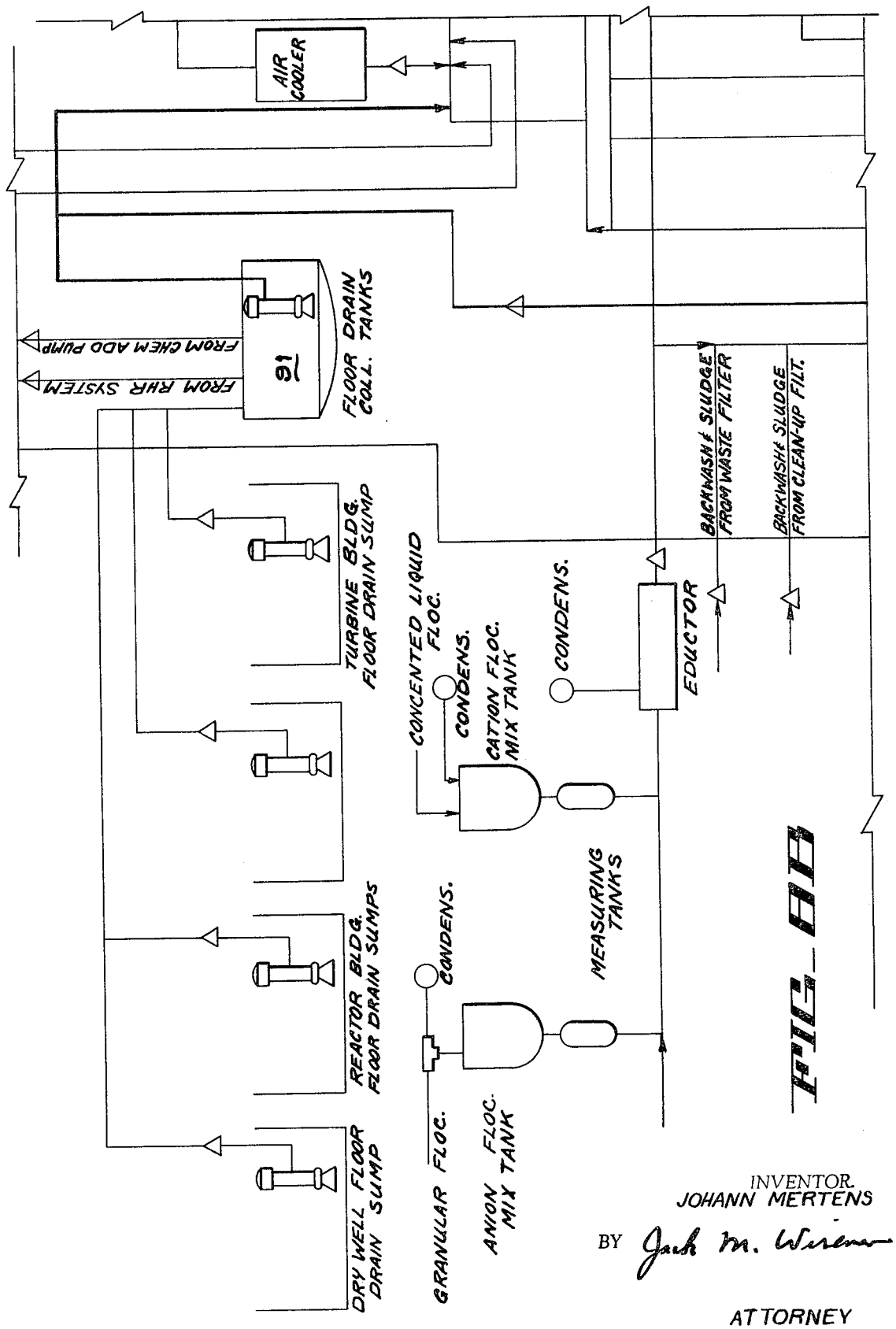

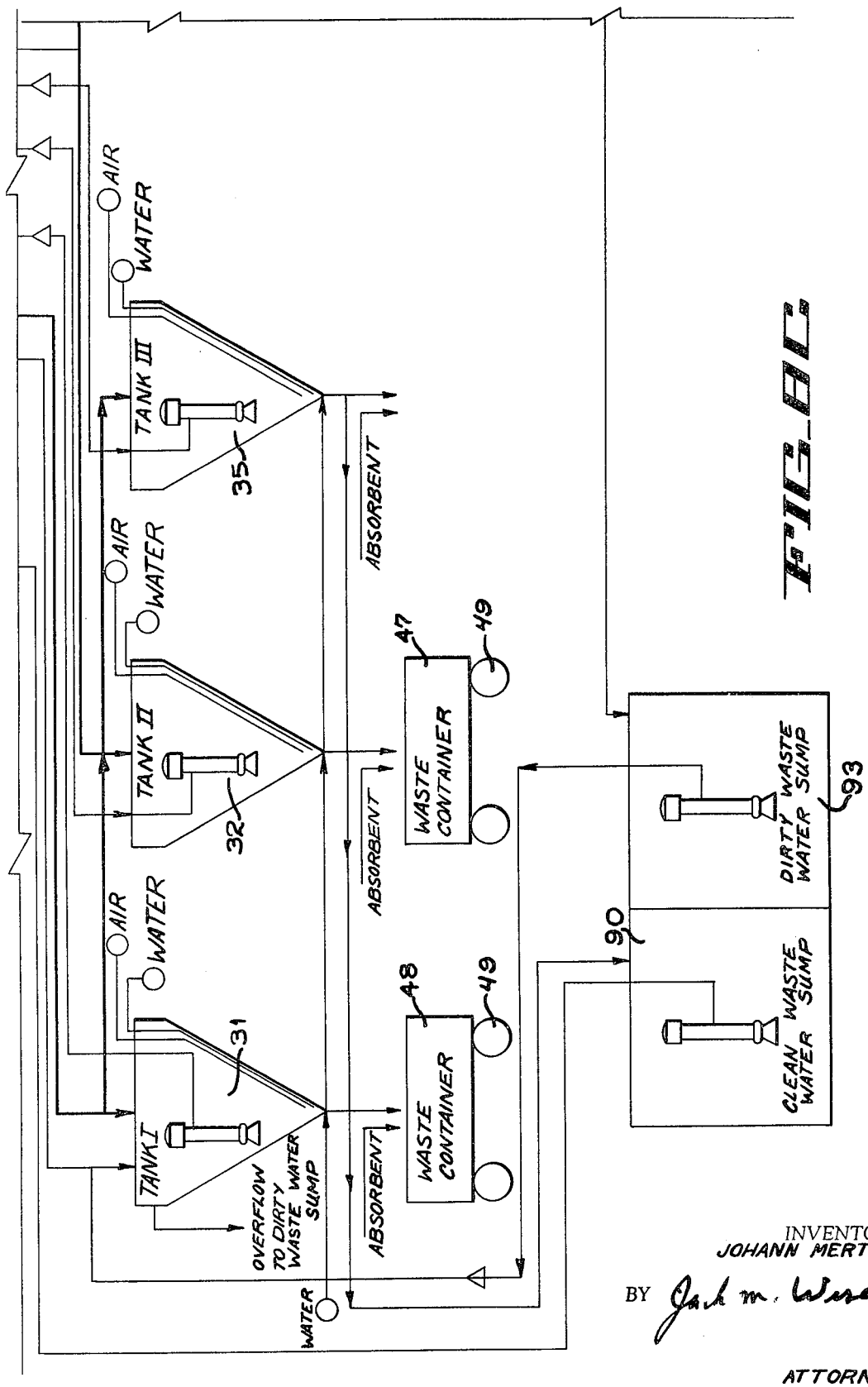

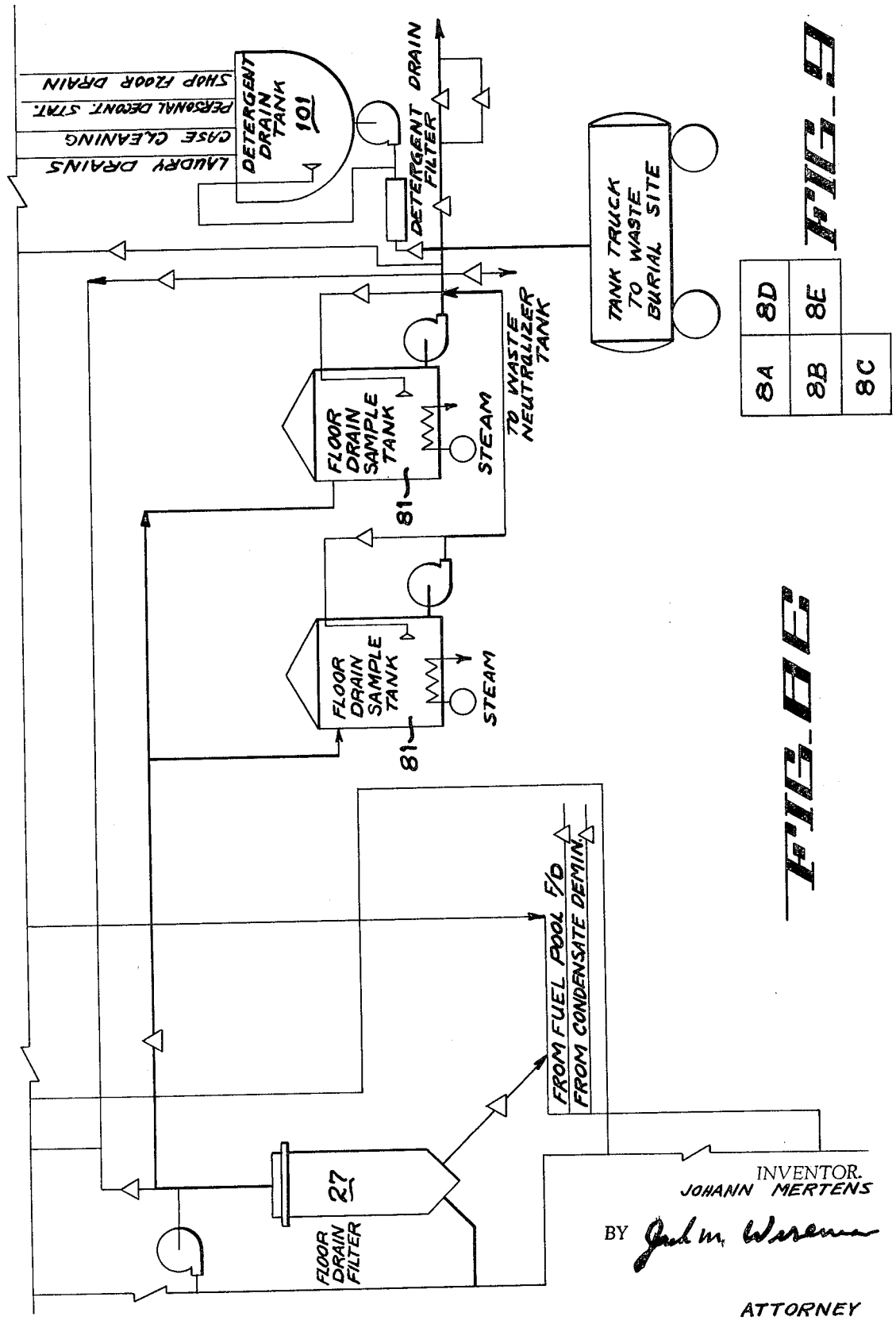

RADIOACTIVE WASTE TREATMENT SYSTEM

BACKGROUND OF THE INVENTION

The present invention relates to radioactive waste treatment systems, and more particularly to a radioactive waste treatment system for a boiling water reactor nuclear power plant.

It is desirable to have a no-effluent radioactive waste treatment system. To do so, the high conductivity of the floor drain waste must be reduced and the quantity of chemical wastes, decontamination and detergent wastes must be reduced. Heretofore, these wastes were filtered and discharged into bodies of waters, such as streams and oceans. This practice was followed because of the high conductivity and high pollution content of the wastes which did not lend itself to treatment in demineralizers.

In handling solid process waste, such as filter sludges and demineralizer resins, it was heretofore the practice to store the same in small phase separator tanks for short periods of time and then subject the waste to refluidizing and a centrifuging action. The foregoing is considered to be an inefficient process for the handling of radioactive waste materials.

SUMMARY OF THE INVENTION

A radioactive waste treatment system in which the solid radioactive process waste, such as filter sludges and ion exchange resins, are collected in large tanks and in which backwash water and floor drain water wastes are percolated through settled solids for filtering and demineralization.

In the system of the present invention, there is a greater utilization of demineralizing resins and filtering materials.

The waste waters are first pre-filtered and pre-mineralized by percolation through settled solids in containers. Preprocessed waste waters, such as pre-filtered and pre-demineralized waste waters, are polished in water treatment systems and are subsequently returned to a condensate storage. As a consequence thereof, floor drain waste heretofore discharged into bodies of water, such as streams and oceans, are now retained.

By virtue of the present invention, there is an optimum utilization of ion exchange resins and filtering agents, thereby effecting greater economy in operation; greater system reliability because of process equipment and fixture simplification; and reduction of maintenance because of obviating the need of equipment such as centrifuges.

In the use of storage and filter tanks in the system of the present invention, the solid wastes are stored for longer periods of time with the result that the radioactivity of the solid wastes is reduced at the time of shipment and also the required frequency for the handling of solid wastes is also reduced.

The collector tanks employed in the present invention provide waste storage; gravity filtration and demineralization; and bottom load-out of the collected waste solids. As a consequence thereof, there is present treated waste waters, whereby all floor drain wastes can be retained. Also, there is reduced consumption of filter material and resins in the radioactive waste system, because the water treatment equipment is now reserved for polishing. Lastly, there are substantially lower activity levels of waste materials at the time of shipping transportable containers to a burial site because of the long storage time in the collector tanks.

DESCRIPTION OF THE DRAWINGS

FIG. 1 is a perspective view of a radioactive waste processing facility with condensate demineralizers for a boiling water reactor power plant.

FIG. 2 is a vertical sectional view of the facility shown in FIG. 1 taken along line 2—2 of FIG. 1.

FIG. 3 is a vertical sectional view of the facility shown in FIGS. 1 and 2 taken along line 3—3 of FIG. 1.

FIG. 4 is a horizontal sectional view of the facility shown in FIGS. 1-3 taken along line 4—4 of FIG. 3.

FIG. 5 is a horizontal sectional view of the facility shown in FIGS. 1-4 taken along line 5—5 of FIG. 3.

FIG. 6 is a vertical sectional view of the facility shown in FIGS. 1-5 taken along line 6—6 of FIG. 3.

FIG. 7 is a vertical sectional view of the facility shown in FIGS. 1-6 taken along line 7—7 of FIG. 3.

FIGS. 8A–8E are diagrammatic illustrations of a flow chart when placed in the arrangement shown in FIG. 9 illustrating the radioactive waste treatment system of the present invention.

PREFERRED EMBODIMENTS OF THE INVENTION

Figure 80:
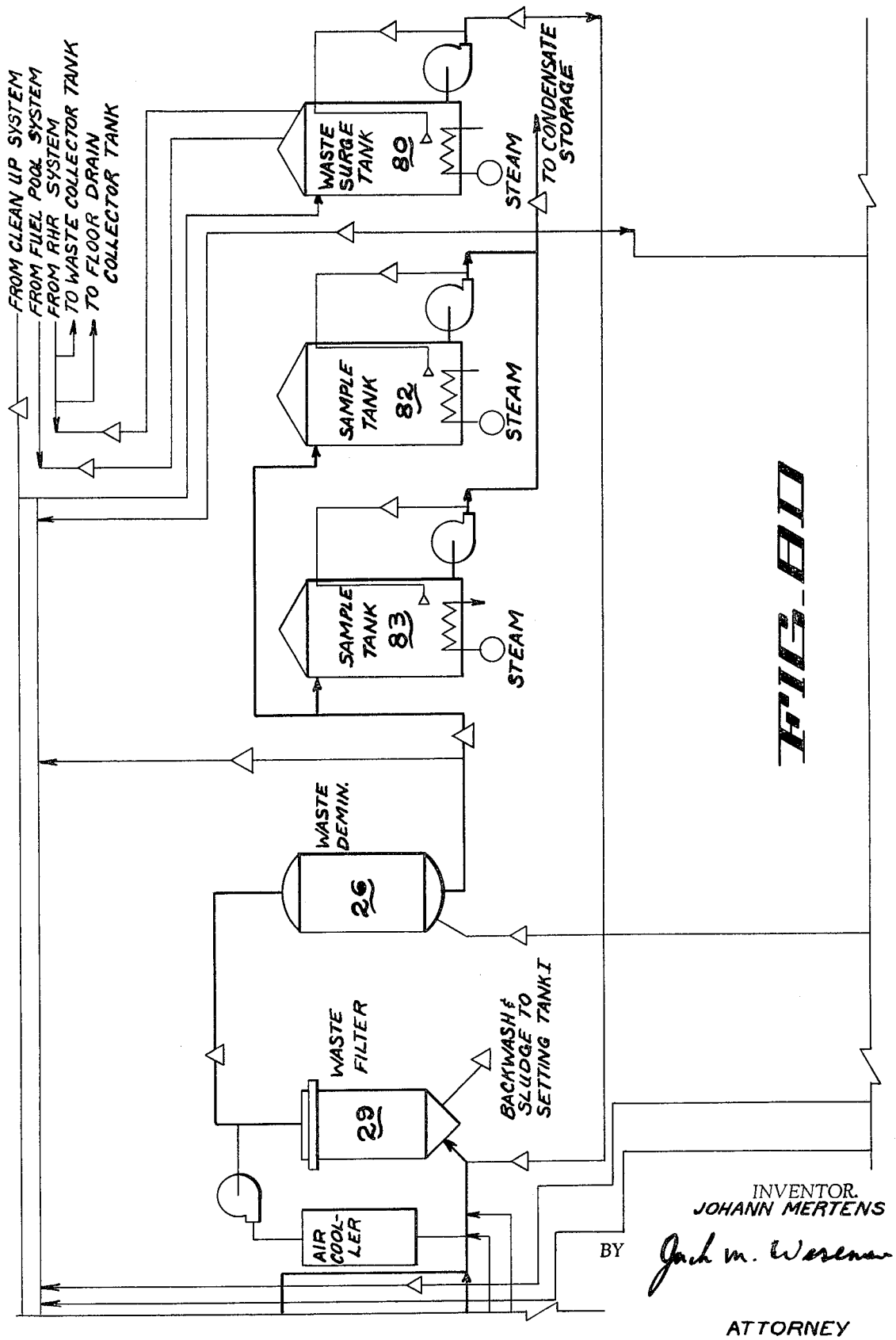

Illustrated in FIG. 1 is a radioactive waste treatment facility 20 employing the present invention. The facility 20 is used in conjunction with a boiling water reactor power plant and includes powdered demineralized resins condensate. It is to be understood, however, that the inventive concepts are also applicable with a boiling water reactor power plant with deep bed condensate demineralizers.

The facility 20 includes a main control station 21 (FIGS. 3 and 4). In the main control station 21 are instruments and controls for water treatment equipment. In addition thereto, a sampling station and waste container control equipment are located in the control station 21. Adjacent to the main control station 21 is a water treatment station 22 (FIGS. 2 and 4) for housing water treatment equipment, which includes a conventional and well-known waste filter 29; conventional and well-known fuel pool filters 23–25; a conventional and well-known waste demineralizer 26; a conventional and well-known floor drain filter 27; and a conventional and well-known floor drain demineralizer 28. The facility 20 may be a part of the reactor building or turbine building. Of course, the facility 20 may be a separate building.

Below the water treatment station 22 is located a solid waste storage station 30 (FIGS. 2 and 5) which includes a tank 31 for receiving surge and sludge from the reactor water cleanup system and the fuel pool filter 23; a tank 32 for receiving other waste sludges; a tank 33 for receiving start-up waste sludges; and a waste collector tank 34. The tank 33 can be used for storage in the event of temporary unusual quantities of waste. The tanks 31-33 are solid waste storage tanks and are of the type disclosed in my copending application filed on Feb. 24, 1971, Ser. No. 118,422 for Apparatus for Removal of Stored Material From Storage Containers.

Under the main control station 21 is a solid waste container fill and container decontamination station 40

(FIGS. 3 and 5) which include sludge discharge devices 41–43 suitable for loading waste into transportable containers 47 and 48 (FIGS. 3 and 6). Electric carts 49 transport the containers 47 and 48 along tracks in the container fill and decontamination station 40. Because of the length of time waste is stored in the tanks 31–33, the radioactivity of the waste material is relatively low at the time the transportable containers are filled.

At the end of the tracks for the electric carts 49 is a container lift station 50 (FIGS. 3, 5 and 7), which includes a suitable lifting device, such as a bridge crane 51. The bridge crane 51 lifts a filled container from the electric cart and carries the filled containers to a loading station and a truck access station 55 for shipping the waste to a burial site. In the container lift station 51 is located a suitable turntable 56 (FIGS. 5 and 7). Containers 49 when carried by the turntable 56 for surface monitoring is subjected to smear tests, container monitoring and decontamination. Decontamination equipment is also provided at the container lift station 50.

In the container fill station 49 (FIGS. 3 and 5) are also located the controls 60 for sludge load-out devices 41–43, absorbent fill addition, moisture content monitor, container capping machine 63, decontamination controls 64, wipe or smear test equipment 65. The foregoing equipment is conventional and well-known. Filled waste containers, such as 47 and 48, are stored in a waste container storage station 70 (FIGS. 5 and 7) which includes waste containers 71–76. The containers are lifted by the crane 51 to be transported for removal. Exterior of the building are located a water surge tank 80, a floor drain waste sample tank 81, a waste sample tank 82 and a waste sample tank 83.

According to the present invention, the solid radioactive waste, such as filter sludges and resins, are collected in the tanks 31–33 from the reactor water clean-up system, fuel pool filters 23 and 24, from the floor drain filters 25 and 27 and from the waste filter 29 of the water treatment equipment. The solid radioactive waste is stored in the tanks 31–33 for an extended period of time, such as 1–3 years, according to the radioactive level thereof. Such waste is removed from the bottom of the tanks 31–33 through the sludge load-out devices 41–43, respectively, and discharged into the transportable containers, such as the containers 47 and 48. The construction of the tanks 31–33 and the sludge load-out devices 41–43 are described in detail in my aforementioned pending application. These load-out devices can incorporate waste solidification process if such be desired.

Also, according to the present invention, the waste collector tank 34 (FIGS. 8A–8E) feeds waste water to the waste filter 29 and the waste discharged from the output of the waste filter 29 advances through the waste demineralizer 26 through the sample tanks 83 and 82 and into the condensate storage which is part of the condensate system, not shown. Backwash waste water, which includes solid filtering material and demineralizer resins, from the waste filter 29 goes to the tank 31. Also, backwash waste water goes from the floor drain demineralizer 28 and the waste demineralizer 26 to the tank 32. This sequence may be readily changed to accommodate various operating conditions. The percolation rates are sufficiently high for gravity filtering of the quantities of backwash water generated during normal operation and start-up. For increasing the percolation rates, a vacuum can be employed at the load-out devices. Thus, preprocessed water is collected in a clean water sump 90 (FIG. 7) and later pumped to the water treatment equipment at the water treatment station 22 for polishing, which water treatment equipment includes the waste filter 29, the waste demineralizer 26, the floor drain demineralizer 28 and the floor drain filter 27 to polish the pre-processed waters.

After polishing, the water is returned to condensate storage, not shown.

All waste water collected in a floor drain collector tank 91 (FIGS. 3 and 5) and a dirty water sump 92 (FIGS. 3 and 7) is first pumped into one of the storage tanks 31–33 and is gravity pre-filtered and pre-demineralized before being polished in either the high purity or low purity water treatment systems.

Chemical waste and detergent waste are stored in tanks 100 and 101, respectively (FIG. 3). An absorbent silo 102 is located at the same station. Above the silo 102 and the tanks 100 and 101 is located a baled waste storage station 105, in which are disposed floculent tanks 106 and 107. Solid wastes, such as cleaning paper and rags, discarded clothing, et cetera are considered baleable waste. A suitable baling machine, not shown, presses the baleable solid wastes into suitable drums.

From the foregoing, it is to be observed that the solid wastes, such as filter sludge, bead resins and powdered demineralized resins, are stored in the tanks 31–33. The tank 31 collects high activity waste for approximately 3 years. After 3 years the sludge is removed on an annual basis and the amount removed is the quantity accumulated over a year. The tanks 32 and 33 collect low activity waste and start-up waste for storage for approximately 1 year. Removal is done preferably on an annual basis leaving sufficient room in the tanks 32 and 33 for start-up operations, which removal is done during refueling time. Thus, for start-up two tanks are available, namely tanks 32 and 33.

At the end of the storage periods, sludge is removed from the tanks 31–33 at the bottom thereof by discharge through the devices 41–43, respectively, into containers, such as the transportable containers 47 and 48. Absorbent is added as required to obtain the prescribed moisture content and then the waste can be solidified by suitable agents.

I claim:

1. A radioactive waste treatment system comprising:

water treatment equipment including means for removing radioactive impurities from water and for discharging water waste and impurities removed therefrom; and storage tank means communicating with said water treatment equipment for receiving water waste from said water treatment equipment, said storage tank means including means for filtering and demineralizing water waste, said storage tank means pre-filtering and pre-demineralizing water waste through percolation through solid waste contained in said storage tank means.

2. A system as claimed in claim 1 wherein said storage tank means is a gravity filter to pre-filter and to predemineralize water waste.

3. A system as claimed in claim 2 wherein the water waste in said storage tank means is percolated through layers of sludge and resin settled therein for the gravity pre-filtering and pre-demineralizing of the water waste.

4. A system as claimed in claim 2 and wherein said water treatment equipment includes waste filters and waste demineralizers for filtering and demineralizing water waste.

5. A system as claimed in claim 1 wherein the pre-filtered and pre-demineralized water waste is returned to said water treatment equipment for polishing.

6. A system as claimed in claim 3 wherein said storage tank means includes a vacuum at the lower portion thereof for increasing the percolation rate.

7. A radioactive waste treatment system comprising:

water treatment equipment including means for removing radioactive impurities from water and for discharging water waste and impurities removed therefrom, said water treatment equipment removing radioactive impurities and discharging solid radioactive waste;

storage tank means communicating with said water treatment equipment for receiving water waste from said water treatment equipment, said storage tank means including means for filtering and demineralizing water waste, said storage tank means receiving solid radioactive waste from said water treatment equipment and storing the solid radioactive waste, water waste for said storage tank means being percolated from layers of the solid radioactive waste therein for the gravity filtering and gravity demineralizing of the water waste, said storage tank means being a gravity filter to pre-filter the water waste from the solid and being a gravity demineralizer to pre-demineralize the water waste, the prefiltered and predemineralized water waste being returned to said water treatment equipment for polishing; and transportable container means adjacent said storage tank means for receiving the solid radioactive waste discharged from said storage tank means.

\* \* \* \* \*